W. N. CORBIT.
HITCH STRAP AND LINE FASTENER.
APPLICATION FILED JUNE 26, 1912.
1,056,007.
Patented Mar. 18, 1913.
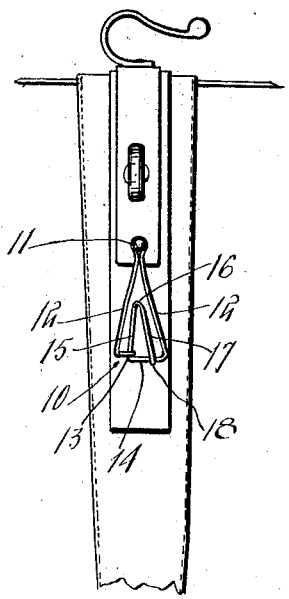
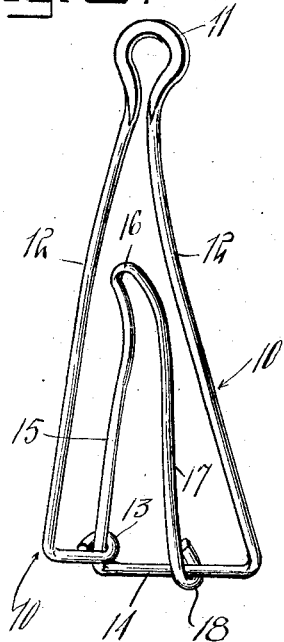
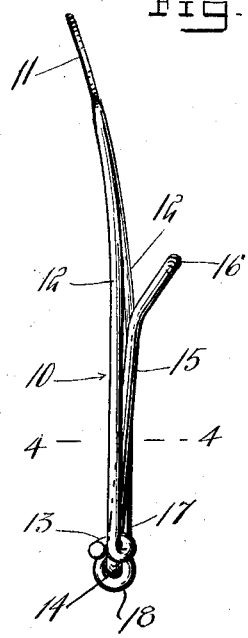
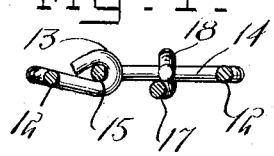
Witnesses
J. C. Simpson
Wm. S. Fowler
Inventor
W. N. Corbit
By Chandlee & Chandlee
Attorneys

UNITED STATES PATENT OFFICE.

WARDNER N. CORBIT, OF ATKINSON, NEBRASKA.

HITCH-STRAP AND LINE FASTENER.

1,056,007. Specification of Letters Patent. Patented Mar. 18, 1913.

Application filed June 26, 1912. Serial No. 706,052.

*To all whom it may concern:*

Be it known that I, WARDNER N. CORBIT, a citizen of the United States, residing at Atkinson, in the county of Holt, State of Nebraska, have invented certain new and useful Improvements in Hitch-Strap and Line Fasteners; and I do hereby declare the following to be a full, clear, and exact description of the invention, such as will enable others skilled in the art to which it appertains to make and use the same.

This invention relates to line and lead strap holders to be secured upon back bands to receive the line and lead straps and relates more particularly to that class of holding devices formed of resilient material and constructed in one piece.

An object of this invention is to construct a line and lead strap holder of above stated nature which would be of extremely simple form and strong and durable in use and which will securely hold the lines and lead straps positioned therein.

Another object is to generally improve and simplify the construction of devices of this character in order that they may be cheaply and readily manufactured and at the same time increasing the efficiency thereof.

With the above and other objects in view, my invention will be more fully described, illustrated in the accompanying drawings showing a preferred embodiment of my device and then specifically pointed out in the claim which is attached to and forms a part of this application.

In the drawings:—Figure 1 is a fragmentary plan view of a portion of the harness with my improved line and lead strap holder positioned thereon. Fig. 2 is a detail perspective view of the device removed. Fig. 3 is a side view thereof. Fig. 4 is a cross sectional view on the line 4—4 of Fig. 3.

Referring more specifically to the drawings, in which similar reference numerals designate corresponding parts throughout, 10 indicates in general the holder which is formed of one piece of resilient material and is bent intermediate its end to form the attaching loop 11 from which extend the diverging arms 12, one of which terminates in the inwardly directed eye 13 while the other arm 12 is bent inwardly and then upwardly through the eye 13, the inwardly bent portion of the second arm being designated by the numeral 14 while the upwardly directed portion thereof is indicated by the numeral 15. The second arm 12 is then bent upon itself as shown at 16 and directed downwardly as shown at 17, the extremity 18 thereof being secured around the inwardly bent portion 14, thus producing the line and lead strap holding hook beneath which the line and lead strap are secured, the hook being normally positioned between the diverging arms 12, thus forming a hook which will tightly clamp the line and strap passed therebeneath against the diverging arms. The upper turned portion of the hook, shown at 16 is preferably directed slightly outwardly to permit of ready engagement of the lines and strap beneath the hook. It will also be noted that the upper ends of the diverging arms 12 are slightly curved to permit said arms to rest properly against the portion of the harness to which the device is secured. It will therefore be seen that I have provided an article for holding the lines and lead strap which will be extremely cheap to manufacture and it will be strong and durable and highly efficient in use. It will further be evident that owing to the specific construction of this holder, the straps forced beneath the hook will be securely held between said hook and the diverging arms, thus preventing accidental disengagement of the straps.

What I claim is:—

An article of manufacture comprising a one piece line and lead strap holder formed of resilient material bent intermediate its ends to produce an attaching loop from which extend the diverging arms one of which terminates in an inwardly directed eye while the other arm is bent inwardly and then upwardly through the eye of the first arm between the diverging portions of said arms, the second arm being then bent upon itself forming a hook between the diverging arms, the extremity of the second arm being secured upon the inwardly bent portion of said arm as and for the purpose set forth.

In testimony whereof, I affix my signature, in presence of two witnesses.

WARDNER N. CORBIT.

Witnesses:
 Mrs. W. N. CORBIT,
 E. W. CORBIT.

Copies of this patent may be obtained for five cents each, by addressing the "Commissioner of Patents, Washington, D. C."